(12) United States Patent
Nakano et al.

(10) Patent No.: US 6,564,645 B1
(45) Date of Patent: May 20, 2003

(54) PRESSURE SENSOR CONSTRUCTED BY JOINING TWO HOUSINGS WITH RING-LIKE METAL PLATE INTERPOSED THEREBETWEEN

(75) Inventors: Jiro Nakano, Okazaki (JP); Satoshi Suto, Okazaki (JP); Tomonari Yamakawa, Aichi-ken (JP); Hiroaki Arashima, Gamagori (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/669,856

(22) Filed: Sep. 27, 2000

(30) Foreign Application Priority Data

Sep. 27, 1999 (JP) .......................... 11-272339

(51) Int. Cl.$^7$ ................................ G01L 7/00
(52) U.S. Cl. ........................................ 73/756
(58) Field of Search .................. 73/756, 715–728; 338/2–5, 36, 42

(56) References Cited

U.S. PATENT DOCUMENTS 4,295,116 A * 10/1981 Studlien ................. 338/4
6,125,707 A   10/2000 Haga et al. .............. 73/756
6,131,467 A * 10/2000 Miyano et al. ........... 73/756

FOREIGN PATENT DOCUMENTS

JP    7-209115    8/1995

* cited by examiner

Primary Examiner—William Oen
(74) Attorney, Agent, or Firm—Oblon, Spivak, McClelland, Maier & Neustadt, P.C.

(57) ABSTRACT

A pressure sensor is constructed to include a sensor housing formed of metal, and a connector housing mainly formed of synthetic resin. The connector housing includes a shoulder portion thereof in the form of a metal plate having an inner and an outer periphery thereof. On the shoulder portion, there is formed a juncture of the sensor and connector housing as a result of joining the sensor and connector housing by curling a projecting portion or one of two end portions of the sensor housing toward the shoulder portion. Wherein, the curling is performed under engagement of the sensor and connector housing therebetween, for assembling the pressure sensor.

24 Claims, 10 Drawing Sheets

PRESSURE SENSOR CONSTRUCTED BY JOINING TWO HOUSINGS WITH RING-LIKE METAL PLATE INTERPOSED THEREBETWEEN

BACKGROUND OF THE INVENTION

1. Field of the Invention

The present invention relates to a pressure sensor to be assembled by mutually engaging a sensor housing formed of metal, and a connector housing mainly formed of synthetic resin.

2. Discussion of the Related Art

One example of such a pressure sensor mentioned above, disclosed in Japanese Patent Application Laid-Open Publication No. 209115/1995, titled "SEMI-CONDUCTOR TYPE PRESSURE SENSOR AND MANUFACTURING METHOD THEREFOR," is generally known.

Referring to FIG. 10, there is shown a section of a pressure sensor 900 constructed according to the conventional technology described in the above publication. As shown in FIG. 10, the conventional technology permits the pressure sensor 900 to be assembled by effecting so called caulking (i.e., curling) directly on a connector housing 1 (formed of synthetic resin) in which terminal pins 2a, 2b and the like have been insert-molded. The caulking is performed by curling a projecting portion or one of two end portions of a sensor housing 3 (formed of metal), resulting in juncture and fixed engagement of the connector and sensor housing 1, 3.

However, the conventional pressure sensor, which is to be assembled by the caulking performed directly on the connector housing 1, suffers from the following problems:

(Problem1)

When the caulking is performed for assembling the pressure sensor 900, the junction of the connector housing 1 formed of synthetic resin and the sensor housing 1, which junction means an abutment surface of the connector housing 1 on which the projecting portion or the one end portion of the connector housing 3 abuts, is subjected to an excessively large stress thereon, leading to a likelihood of undesired deformation or failure of the connector housing 1.

(Problem 2)

Since the connector housing 1 confines a fluid 13 of high-pressure in a fluid-tight manner, the junction of connector housing 1 with the sensor housing 3 is, in operation of the pressure sensor 900, subjected to a large compressive stress thereon, unexpectedly resulting in deformation or deflection of the connector housing 1 at the above junction thereof.

One of possible solutions to those problems is, for instance, to design the connector housing 1 so as to have an increased area for the junction of the connector housing 1. However, this solution would increase the total size of a pressure sensor, meaning that downsizing thereof would be prevented.

BRIEF SUMMARY OF THE INVENTION

It is therefore an object of the present invention to provide a pressure sensor which is available even under high pressure and which is capable of being downsized.

This object indicated above may be achieved according to any one of the following modes of this invention. Each of these modes of the invention is numbered like the appended claims, and depends from the other mode or modes, where appropriate. This type of explanation about the present invention is for better understanding of some ones of a plurality of technical feats and a plurality of combinations thereof disclosed in this specification, and dose not mean that the plurality of technical features and the plurality of combinations in this specification are interpreted to encompass only the following modes of this invention:

(1) A pressure sensor including a sensor housing formed of metal, and a connector housing mainly formed of synthetic resin. The connector housing includes a shoulder portion thereof in the form of a metal plate having an inner and an outer periphery thereof, on which shoulder portion a juncture of the sensor and connector housing is formed as a result of joining the sensor and connector housing by curling a projecting portion or one of two end portions of the sensor housing toward the shoulder portion. Further, the curling is performed under engagement of the sensor and connector housing therebetween, for assembling the pressure sensor.

In the pressure sensor according to this mode (1), the shoulder portion of the connector housing functioning as the junction of the connector housing with the sensor housing is constructed by the metal plate. As a result, the strength of pressure resistance of the pressure sensor is increased, preventing the connector housing from being unexpectedly deformed or failed when manufactured. The increase in the strength of pressure resistance of the pressure sensor would also eliminate a likelihood of undesired deformation and deflection of the connector housing, leading to availability of the pressure sensor even in high-pressure environment.

In the pressure sensor according to this mode (1), the term "connector housing" may be interpreted to mean a sub-housing of the pressure sensor for accommodating at least one external connector, and the term "sensor housing" may be interpreted to mean another sub-housing of the pressure sensor for receiving a fluid, a pressure of which is to be measured by the pressure sensor. It is not indispensable in practicing the present invention, to configure the sensor housing to accommodate a pressure-sensitive element In the pressure sensor according to this mode (1), the term "inner periphery of the metal plate" can be called a "through hole" for permitting a terminal pin to be passed therethrough.

(2) The pressure sensor according to the above mode (1), wherein the metal plate is generally shaped as a ring.

(3) The pressure sensor according to the above mode (1) or (2), wherein the sensor housing is coaxially fitted with the connector housing, wherein the metal plate includes one reference line intersecting a plane of the metal plate, and wherein the metal plate is fitted with the connector housing such that the connector housing extends substantially parallel to the reference line.

(4) The pressure sensor according to any one of the above modes (1)–(3), wherein the junction of the sensor and connector housing is located on an edge of the shoulder portion of the connector housing, which edge is formed so as to include, on a cross-section obtained by hypothetically cutting the shoulder portion by a reference plane perpendicular to a plane of the metal plate, at least one of a curved line, a straight line intersecting the plane of the metal plate, and a stepped line.

The pressure sensor according to this mode (4) would enable an area of a surface on which a contact of the shoulder portion of the connector with the sensor housing is performed, to be easily increased as compared with the case of a metal plate having a flat end face thereof. The increase in the contacting area contributes to even distribution of pressures acting on a portion of the connector housing which is contacted with one of two end faces of the metal plate, meaning that the strength of pressure resistance of the pressure sensor is improved.

(5) The pressure sensor according to any one of the above modes (1)–(4), wherein the connector housing is integrally formed together with the metal plate.

The pressure sensor according to this mode (5) would permit a reduction in the manufacturing time thereof, and would also permit close engagement between the metal plate and the remainder of the connector housing which is formed of synthetic resin. The close engagement between the metal plate and the remainder of the connector housing would, for example, facilitate to downsize the pressure sensor, and to increase the strength of the pressure resistance of the pressure sensor.

(6) The pressure sensor according to the above mode (5), wherein the connector housing is formed by a process in which the metal plate is inserted into a mold for molding the connector housing, prior to the molding, and then a mass of raw synthetic resin is fed into the mold and is thereafter hardened.

(7) The pressure sensor according to any one of the above modes (1)–(6), wherein the metal plate is fitted with the connector housing unremovably therefrom, by holing the metal plate by two opposing portions of the connector housing which cooperate to cause the metal plate to be interposed therebetween.

(8) The pressure sensor according to any one of the above modes (1)–(7), wherein the inner periphery of the metal plate is formed so as to extend, on a cross-section obtained by hypothetically cutting the metal plate by one reference plane substantially perpendicular to a direction in which pressure to be measured by the pressure sensor acts therein, to form one closed line other than a true circle.

In the pressure sensor according to this mode (8), the inner periphery of the metal plate is formed so as to extend on the cross-section of the metal plate along the closed line other than a true circle. On the other hand, in general, a space formed in the inner periphery of the metal plate is intended for permitting at least one conductor to be passed through the inner periphery.

Therefore, the pressure sensor according to this mode (8) would permit the metal plate to be configured so as to avoid the inner periphery to have an excessive dimension, owing to the flexibility in shape of the cross-section of the inner periphery. The avoidance of the excessively increased size of the inner periphery permits an increase in area of a surface on which a contact of the metal plate with the remainder of the connector housing is performed. The increased contacting area leads to an increased seating area in which the remainder of the connector housing, formed of synthetic resin, is to be seated on a surface of the metal plate, and eventually leads to a reduced compressive stress acting on the synthetic resin. The reduced compressive stress permits the pressure sensor to be available even under high-pressure.

In the pressure sensor according to this mode (8), the acceptance of the closed line other than a true circle as the cross-sectional shape of the inner periphery would also permit the length of the closed line to be longer than the true circle.

On the other hand, there is formed an annular portion within a bearing part of the synthetic resin of the connector housing. The bearing part bears a shearing stress produced in operation of the pressure sensor, and the bearing part is, for example, located between the metal plate and the sensor housing. The annular portion extends substantially parallel to a direction in which the sharing stress acts within the bearing part of the connector housing.

To refer to the relationship in length between the closed line mentioned above, and a circumference of a transversal section of the annular portion mentioned above, the longer the closed line, the longer the circumference.

Additionally, the longer the above circumference of the transversal section of the annular portion, the smaller the sharing stress of the above bearing part of the connector housing. The small sharing stress eliminates a necessity to design the connector housing so as to have the bearing part of a longer dimension for reducing the sharing stress of the bearing part. The elimination of the necessity in designing dimension permits the bearing part to have a reduced thickness thereof, enabling the pressure sensor to be downsized.

(9) The pressure sensor according to the above mode (8), wherein the inner periphery of the metal plate includes at least one of a convex projecting from the true circle outwardly thereof, and a concave projecting from the true circle inwardly thereof.

(10) The pressure sensor according to the above mode (8) or (9), wherein the metal plate is fitted with the connector housing such that a space formed in the inner periphery of the metal plate is filled with the synthetic resin of the connector housing.

(11) The pressure sensor according to any one of the above modes (8)–(10), wherein the connector housing includes a connecting portion thereof with which a connector is to be connected, from which connecting portion at least one conductor extends passing through the inner periphery of the metal plate toward the sensor housing.

(12) The pressure sensor according to the above mode (11), wherein the inner periphery of the metal plate is configured to have a necessary and sufficient dimension permitting the at least one conductor to pass through the inner periphery of the metal plate.

(13) The pressure sensor according to any one of the above modes (1)–(12), wherein the metal plate is formed such that at least one of a continued groove, ridge and stepped portion extends along the entire circumferential length of at least one of the inner and outer periphery of the metal plate, with a corresponding portion of the connector housing fitted with the at least one of the continued groove, ridge and stepped portion.

In the pressure sensor according to this mode (13), the metal plate is so formed as to have a projecting circumferential portion thereof in relation to a portion of the metal plate adjacent to the projecting circumferential portion, due to the presence of the at least one of the continued groove, ridge and stepped portion of the metal plate. The projecting circumferential portion of the metal plate can be tightly interposed by two portions of the connector housing opposing to each other in a direction in which pressure to be measured by the pressure sensor acts therein, together with of a portion of the connector housing which is integrally formed with the above two opposing portions and which is adjacent to the projecting circumferential portion of the metal plate in a direction intersecting the above acting direction of pressure to be measured.

On the other hand, the amount of shrinkage of an object made of synthetic resin is larger than that of an object made of metal, in general.

Consequently, in the pressure sensor according to this mode (13), at least in the event where the above projecting circumferential portion of the metal plate is disposed at the proximity of the sensor housing, the amount of a sink of a portion of the connector housing adjacent to one of two end faces of the metal plate which is closer to the sensor housing than the other end face would be reduced, after the connector housing has been integrally formed in the presence of the metal plate. Wherein, the sink, which occurs due to an increase in shrinkage of the synthetic resin with a drop in the temperature of the synthetic resin, causes a gap between the one end face of the metal plate and the adjacent portion of the connector housing.

Owing to this fact, when the pressure sensor according to this mode (13) is installed in a vehicle or the like, fatigue of a metal component of the connector housing (e.g., a bonding wire for bonding a pressure-sensitive element and a conductor both disposed within the connector housing), which fatigue is to result from vibration of the connector housing due to the gap between the one end face of the metal plate and the adjacent portion of the connector housing, would be eliminated, leading to an improvement in reliability and durability of the pressure sensor.

(14) The pressure sensor according to the above mode (13), wherein the connector housing is integrally formed together with the metal plate, and wherein the at least one of the continued groove, ridge and stepped portion of the metal plate is disposed at the proximity of one of two end faces of the metal plate which is closer to the sensor housing than the other end face.

(15) A pressure sensor including a sensor housing formed of metal, and a connector housing mainly formed of synthetic resin. The connector housing includes a shoulder portion thereof in the form of a metal plate having an inner and an outer periphery thereof, on which shoulder portion the connector housing is engaged with the sensor housing, for assembling the pressure sensor. Further, a junction of the sensor and connector housing is located on an edge of the shoulder portion of the connector housing, which edge is formed so as to include, on a cross-section obtained by hypothetically cutting the shoulder portion by a reference plane perpendicular to a plane of the metal plate, at least one of a curved line, a straight line intersecting the plane of the metal plate, and a stepped line.

Wherein a junction of the sensor and connector housing is located on an edge of the shoulder portion of the connector housing, which edge is formed so as to include, on a cross-section obtained by hypothetically cutting the shoulder portion by a reference plane perpendicular to a plane of the metal plate, at least one of a curved line, a straight line intersecting the plane of the metal plate, and a stepped line.

The pressure sensor according to this mode (15) would enable an area of a surface on which a contact of the shoulder portion of the connector with the sensor housing is performed, to be easily increased as compared with the case of a metal plate having a flat end face thereof. The increase in the contacting area contributes to even distribution of pressures acting on a portion of the connector housing which is contacted with one of two end faces of the metal plate, meaning that the strength of pressure resistance of the pressure sensor is improved.

(16) A pressure sensor including a sensor housing formed of metal, and a connector housing mainly formed of synthetic resin. The connector housing includes a shoulder portion thereof in the form of a metal plate having an inner and an outer periphery thereof, on which shoulder portion the connector housing is engaged with the sensor housing, for assembling the pressure sensor. Further, the connector housing is integrally formed together with the metal plate.

The pressure sensor according to this mode (16) would permit a reduction in the manufacturing time thereof; and would also permit close engagement between the metal plate and the remainder of the connector housing which is formed of synthetic resin. The close engagement between the metal plate and the remainder of the connector housing would, for example, facilitate to downsize the pressure sensor, and to increase the strength of the pressure resistance of the pressure sensor.

(17) The pressure sensor according to the above mode (16), wherein the connector housing is formed by a process in which the metal plate is inserted into a mold for molding the connector housing prior to the molding, and then a mass of raw synthetic resin is fed into the mold and is thereafter hardened.

(18) A pressure sensor including, a sensor housing formed of metal, and a connector housing mainly formed of synthetic resin. The connector housing includes a shoulder portion thereof in the form of a metal plate having an inner and an outer periphery thereof, on which shoulder portion the connector housing is engaged with the sensor housing, for assembling the pressure sensor. Further, the inner periphery of the metal plate is formed so as to extend, on a cross-section obtained by hypothetically cutting the metal plate by one reference plane substantially perpendicular to a direction in which pressure to be measured by the pressure sensor acts therein, to form one closed line other than a true circle.

In the pressure sensor according to this mode (18), the inner periphery of the metal plate is formed so as to extend on the cross-section of the metal plate along the closed line other than a true circle. On the other hand, in general, a space formed in the inner periphery of the metal plate is intended for permitting at least one conductor to be passed through the inner periphery.

Therefore, the pressure sensor according to this mode (18) would permit the metal plate to be configured so as to avoid the inner periphery to have an excessive dimension, owing to the flexibility in shape of the cross-section of the inner periphery. The avoidance of the excessively increased size of the inner periphery permits an increase in area of a surface on which a contact of the metal plate with the remainder of the connector housing is performed. The increased contacting area leads to an increased seating area in which the remainder of the connector housing, formed of synthetic resin, is to be seated on a surface of the metal plate, and eventually leads to a reduced compressive stress acting on the synthetic resin. The reduced compressive stress permits the pressure sensor to be available even under high-pressure.

In the pressure sensor according to this mode (18), the acceptance of the closed line other than a true circle as the cross-sectional shape of the inner periphery would also permit the length of the closed line to be longer than the true circle.

On the other hand, there is formed an annular portion within a bearing part of the synthetic resin of the connector housing. The bearing part bears a shearing stress produced in operation, and the bearing part is, for example, located between the metal plate and the sensor housing. The annular portion extends substantially parallel to a direction in which the sharing stress acts within the bearing part of the connector housing.

To refer to the relationship in length between the closed line mentioned above, and a circumference of a transversal section of the annular portion mentioned above, the longer the closed line, the longer the circumference.

Additionally, the longer the above circumference of the transversal section of the annular portion, the smaller the sharing stress of the above bearing part of the connector housing. The small sharing stress eliminates a necessity to design the connector housing so as to have the bearing part of a longer dimension for reducing the sharing stress of the bearing part. The elimination of the necessity in designing dimension permits the bearing part to have a reduced thickness thereof, enabling the pressure sensor to be downsized.

(19) The pressure sensor according to the above mode (18), wherein the inner periphery of the metal plate includes at least one of a convex projecting from the true circle outwardly thereof, and a concave projecting from the true circle inwardly thereof.

(20) The pressure sensor according to the above mode (18) or (19), wherein the metal plate is fitted with the connector housing such that a space formed in the inner periphery of the metal plate is filled with the synthetic resin of the connector housing.

(21) The pressure sensor according to any one of the above modes (18)–(20), wherein the connector housing includes a connecting portion thereof with which a connector is to be connected, from which connecting portion at least one conductor extends passing through the inner periphery of the metal plate toward the sensor housing.

(22) The pressure sensor according to the above mode (21), wherein the inner periphery of the metal plate is configured to have a necessary and sufficient dimension permitting the at least one conductor to pass through the inner periphery of the metal plate.

(23) A pressure sensor including a sensor housing formed of metal, and a connector housing mainly formed of synthetic resin. The connector housing includes a shoulder portion thereof in the form of a metal plate having an inner and an outer periphery thereof, on which shoulder portion the connector housing is engaged with the sensor housing, for assembling the pressure sensor. Further, the metal plate is formed such that at least one of a continued groove, ridge and stepped portion extends along the entire circumferential length of at least one of the inner and outer periphery of the metal plate, with a corresponding portion of the connector housing fitted with the at least one of the continued groove, ridge and stepped portion.

In the pressure sensor according to this mode (23), the metal plate is so formed as to have a projecting circumferential portion thereof in relation to a portion of the metal plate adjacent to the projecting circumferential portion, due to the presence of the at least one of the continued groove, ridge and stepped portion of the metal plate. The projecting circumferential portion of the metal plate can be tightly interposed by two portions of the connector housing opposing to each other in a direction in which pressure to be measured by the pressure sensor acts therein, together with a portion of the connector housing which is integrally formed with the above two opposing portions and which is adjacent to the projecting circumferential portion of the metal plate in a direction intersecting the above acting direction of pressure to be measured.

On the other hand, the amount of shrinkage of an object made of synthetic resin is larger than that of an object made of metal, in general.

Consequently, in the pressure sensor according to this mode (23), at least in the event where the above projecting circumferential portion of the metal plate is disposed at the proximity of the sensor housing, the amount of a sink of a portion of the connector housing adjacent to one of two end faces of the metal plate which is closer to the sensor housing than the other end face would be reduced, after the connector housing has been integrally formed in the presence of the metal plate. Wherein, the sink, which occurs due to an increase in shrinkage of the synthetic resin with a drop in the temperature of the synthetic resin, causes a gap between the one end face of the metal plate and the adjacent portion of the connector housing.

Owing to this fact, when the pressure sensor according to this mode (23) is installed in a vehicle or the like, fatigue of a metal component of the connector housing (e.g., a bonding wire for bonding a pressure-sensitive element and a conductor both disposed within the connector housing), which fatigue is to result from vibration of the connector housing due to the gap between the one end face of the metal plate and the adjacent portion of the connector housing, would be eliminated, leading to an improvement in reliability and durability of the pressure sensor.

(24) The pressure sensor according to the above mode (23), wherein the connector housing is integrally formed together with the metal plate, and wherein the at least one of the continued groove, ridge and stepped portion of the metal plate is disposed at the proximity of one of two end faces of the metal plate which is closer to the sensor housing than the other end face.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Several presently preferred embodiments of the invention will be described in detail by reference to the drawings in which like numerals are used to indicate like elements throughout.

(First Embodiment)

Figure 1:
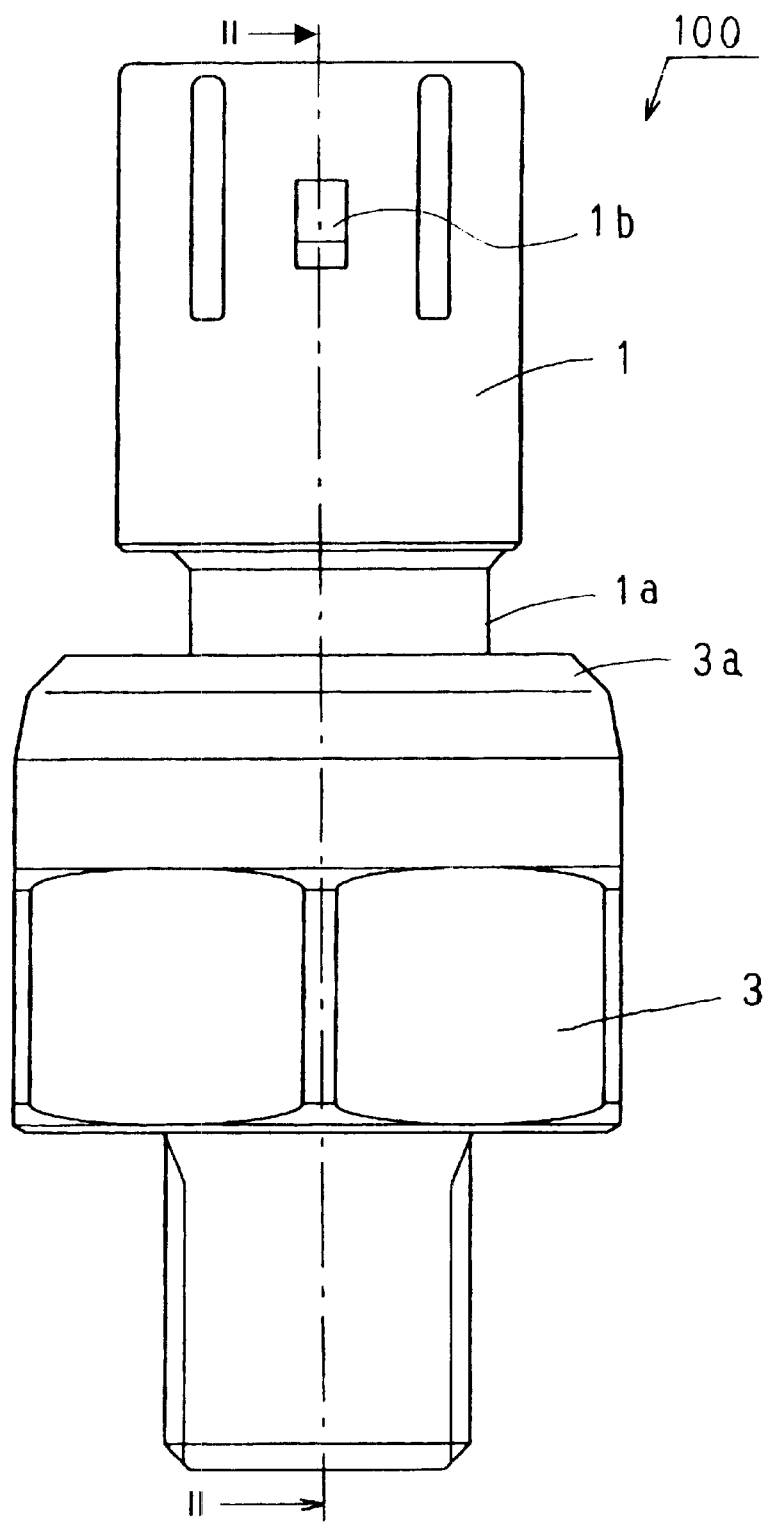
FIG. 1 is a side elevation view illustrating a pressure sensor 100 constructed according to a first embodiment of this invention.

Referring first to FIG. 1, there is shown a side elevation view of a pressure sensor 100 constructed according to a first embodiment of the present invention. The pressure sensor 100 includes a connector housing 1 mainly formed of synthetic resin, and a sensor housing 3 formed of metal. The pressure sensor 100 has been assembled by curling an end portion 3a of the sensor housing 3, to thereby effect so-called caulking between the connector and sensor housing 1, 3. In FIG. 1, reference numeral "1a" denotes a neck portion of the connector housing 1, and "1b" denotes a mechanically engaging portion (e.g., a stop) formed on the connector housing 1, which is intended for effecting plug-in connection with a connector not shown in FIG. 1.

Figure 2:
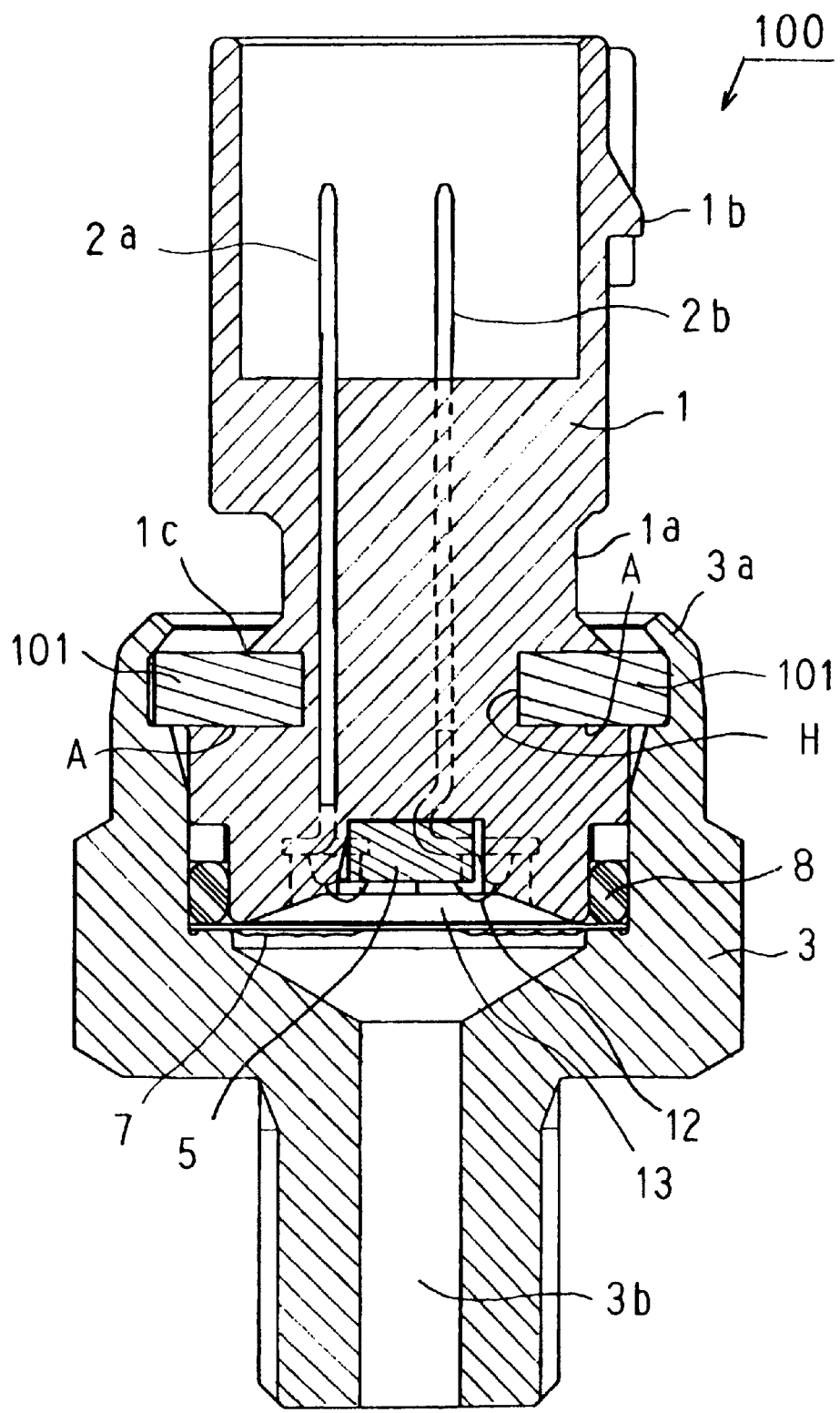
FIG. 2 is a sectional view taken along line II—II of FIGS. 1 and 3 and in the direction of the arrows in FIGS. 1 and 3.

Referring now to FIG. 2, there is shown a longitudinal section of the pressure sensor 100. A shoulder portion 1c of the connector housing 1, which is located downwardly of the neck portion 1a of the connector housing 1 in FIG. 2, is constructed by a ring-like metal plate 101 intended for reinforcement of the connector housing 1. Terminal pins 2a, 2b, which is connected with a pressure-sensitive element 5, extend through a through hole H formed within the metal plate 101, up to an upper portion of the connector housing 1.

For performing the caulking indicated above, the sensor housing 3 has been curled inwardly at the end portion 3a over the entire of an outer circumference of the metal plate 101, such that pressures are so applied to the metal plate 101 that these pressures are generally evenly distributed on the entire of a bottom face A of the metal plate 101.

Pressure which has been introduced through a pressure induction hole 3b formed within the sensor housing 3 is transferred by way of a seal diaphragm 7, a confined liquid (one example of a pressure transfer media) 13, etc., up to the pressure-sensitive element 5 mentioned above. The pressure-sensitive element 5 produces an electrical signal depending upon the level of pressure to be measured by the pressure sensor 100, and then outputs the electrical signal through bonding wires 12 to the respective terminal pins 2a, 2b. In FIG. 2, reference numeral "8" denotes a O-ring (one example of a seal member for creating seal between the connector housing 1 and the sensor housing 3).

Figure 3:
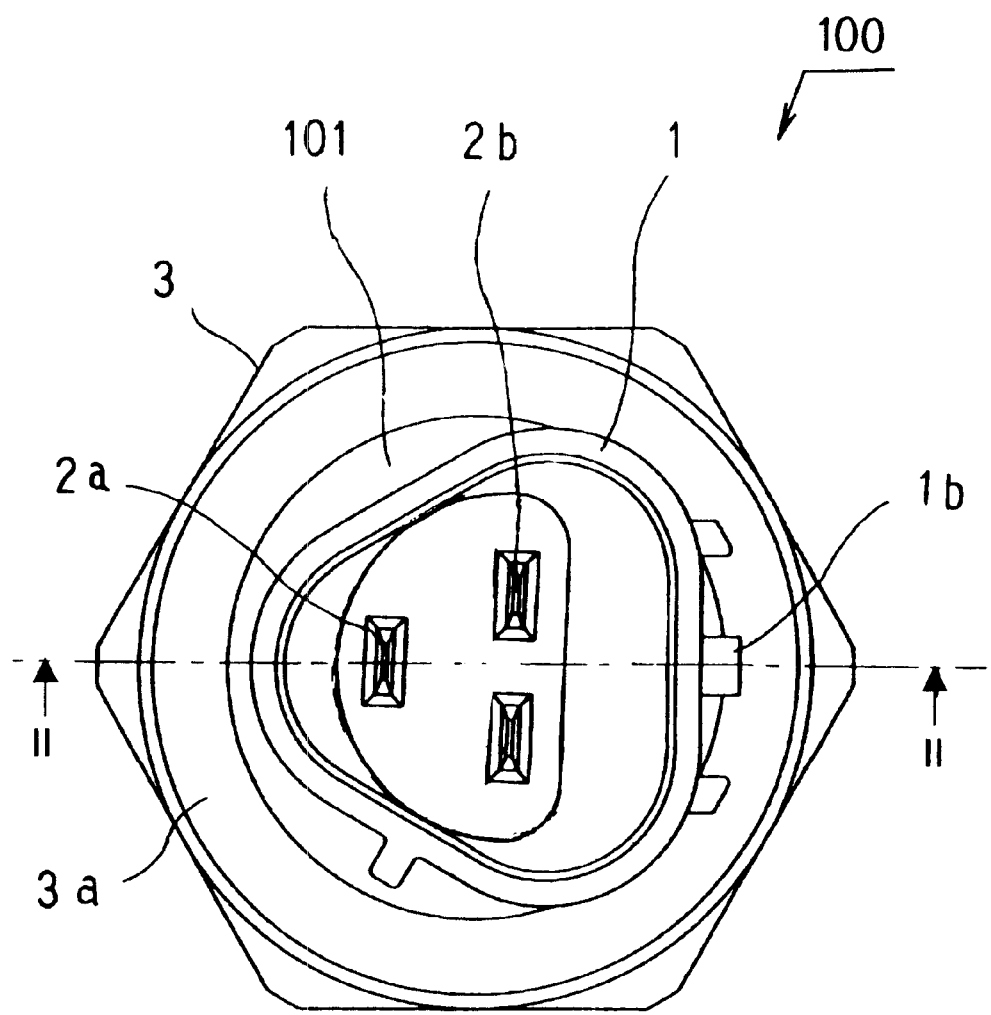
FIG. 3 is a top view illustrating the pressure sensor 100 shown in FIG. 1.

Referring now to FIG. 3, there is shown a top view of the pressure sensor 100. As it will be also understood from FIG. 3, the caulking described above (i.e., curling at the end portion 3a of the sensor housing 3) has been performed such that the metal plate 101 so receives pressures that they are generally evenly distributed on the entire of the bottom face A of the metal plate 101.

In the preferred embodiment, since the pressure sensor 100 has been constructed in the above-mentioned manner, the strength of pressure resistance of the connector housing 1 at the shoulder portion 1c on which the junction of the connector housing 1 and the sensor housing 3 is to be formed has been highly improved. The high improvement would prevent the synthetic resin forming the connector housing 1 from being undesirably deformed or broken at the time of manufacture of the pressure sensor 100.

The above high improvement in the strength of pressure resistance of the connector housing 1 would eliminate a likelihood of undesired deformation or deflection of the connector housing 1, resulting in creation a pressure sensor available even in high pressure environment.

(Second Embodiment)

Figure 4:
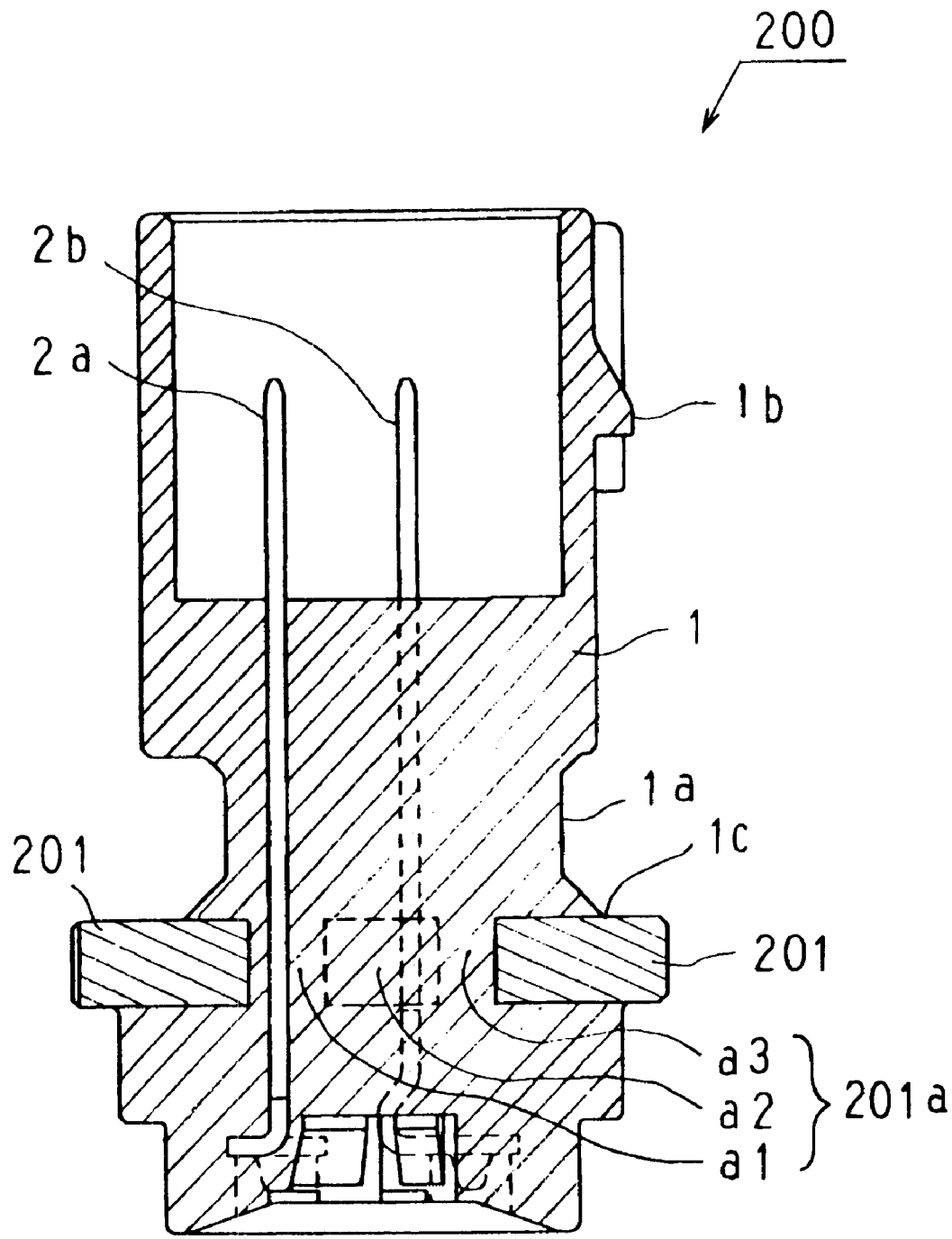
FIG. 4 is a longitudinally sectional view illustrating a part of a pressure sensor 200 constructed according to a second embodiment of this invention.

Referring now to FIG. 4, there is shown a longitudinal section of a part of a pressure sensor 200 constructed according to a second embodiment of the present invention, which part has been integrally molded together with a connector housing 1 formed of synthetic resin. While the pressure sensor 200 has an arrangement thereof similar to that of the pressure sensor 100 according to the first embodiment described above, but the pressure sensor 200 has a distinct feature in shape of an inner periphery (i.e., a through hole) of a ring-like metal plate 201.

Figure 5A:
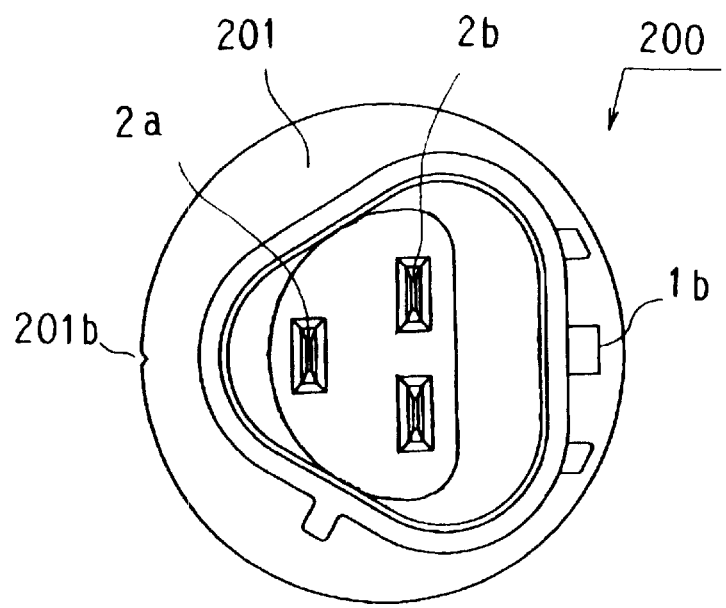
FIG. 5A is a top view illustrating the pressure sensor 200 shown in FIG. 4.
Figure 5B:
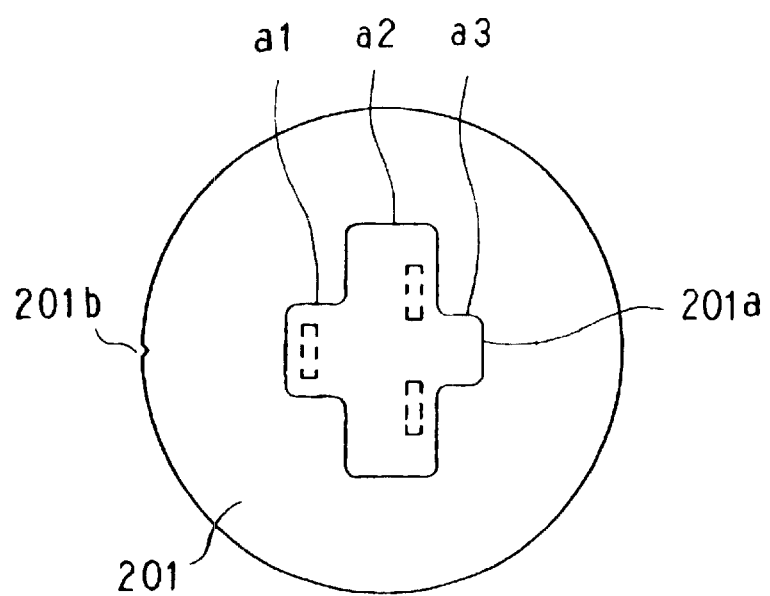
FIG. 5B is a top view illustrating a metal plate 201 which is a part of the pressure sensor 200 shown in FIG. 4.

Referring now to FIGS. 5A and 5B, there are shown a top view of the pressure sensor 200, and a top view of the metal plate 201, which is a part of the pressure sensor 200.

The metal plate 201 is provided at its outer periphery with a groove 201b for location to be used at the time of manufacture of the pressure sensor 200. The inner periphery (i.e., the through hole) 201a is constructed so as to have, on a transversal cross-section of the metal plate 201, as shown in FIG. 5B, twelve liner segments and the like, which segments include segments a1, a2, and a3. That is, the inner periphery (i.e., the through hole) 201a is configured to form, on the above transversal cross-section, a closed shape in the form of one ring having four convexes or four concaves.

The thus constructed pressure sensor 200 would permit an increase in an area of a seating surface on which the synthetic resin of the connector housing 1 is seated to a corresponding portion of the metal plate 20. As a result, a compressive stress acting on the synthetic resin of the connector housing 1 can be reduced, leading to provision of a pressure sensor available even under high pressure.

Moreover, irregularities (i.e., a projections-and-recesses structure) of the inner periphery (i.e., the through hole) 201a of the metal plate 201, as shaped generally as a ring, would provide a longer circumferential length of an annular portion of the connector housing 1 which bears a sharing stress produced in operation of the pressure sensor 200. The longer circumferential length would reduce the thickness of a portion of the connector housing 1 below the metal plate 201 in FIG. 4, eventually permitting downsizing of the pressure sensor 200.

Figure 6A:
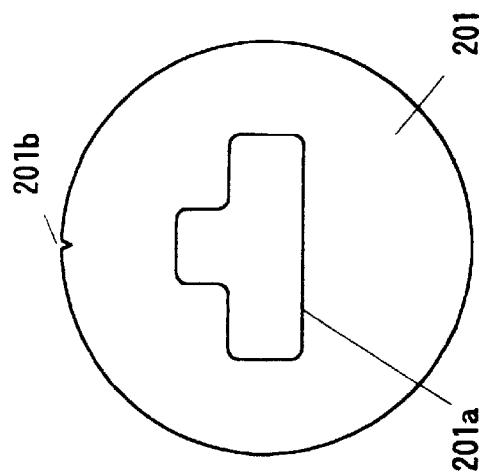
FIGS. 6A, 6B and 6C are views illustrating modifications of the metal plate 201 shown in FIG. 5B.
Figure 6B:
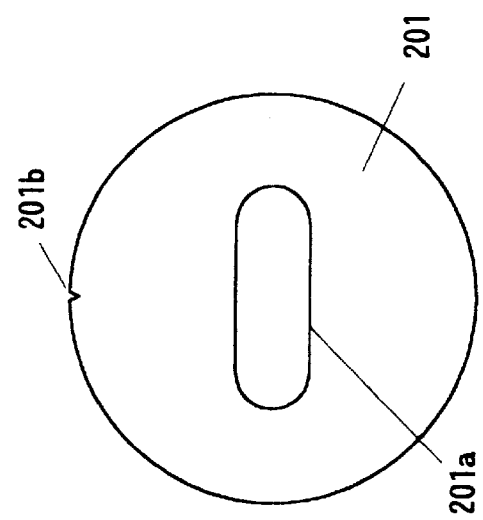
Figure 6C:
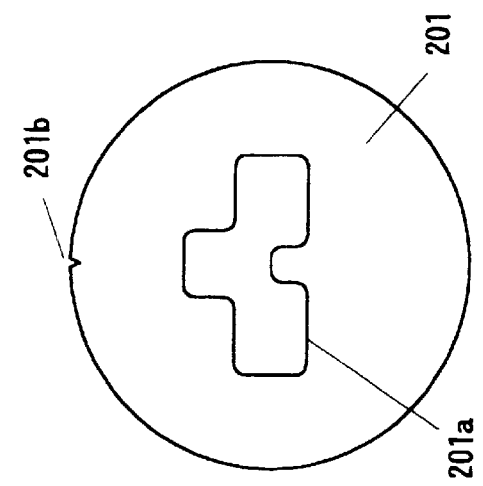

Referring now to FIGS. 6A, 6B and 6C, there are shown modifications in shape of the metal plate 201 in the second embodiment. Forming the inner periphery (i.e., the through hole) of the metal plate 201 so as to have shapes, which are, for example, shown in FIGS. 6A, 6B and 6C, would provide the same function and results as the second embodiment previously described does.

(Third Embodiment)

Figure 7:
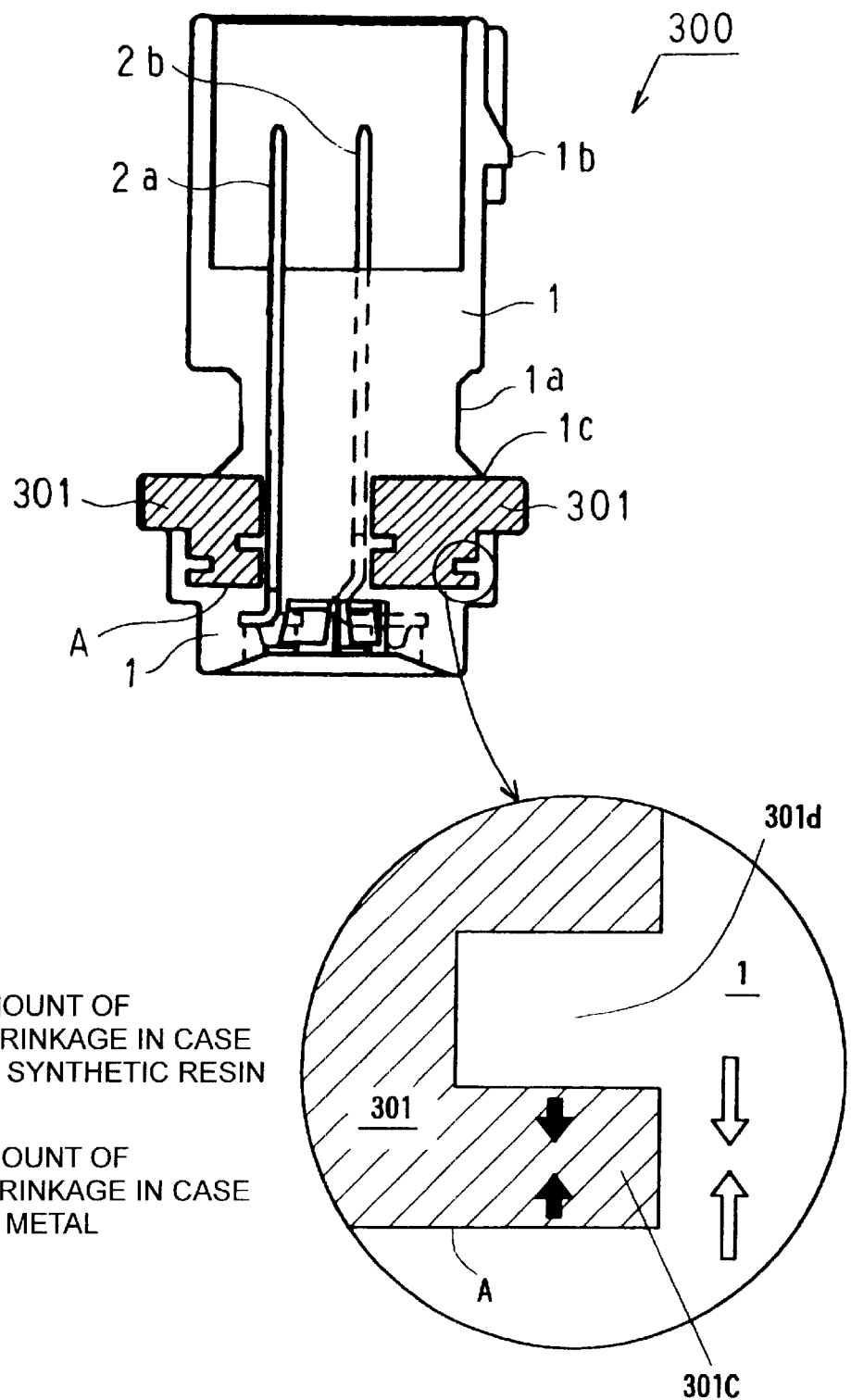
FIG. 7 is a longitudinally sectional view illustrating a part of a pressure sensor 300 constructed according to a third embodiment of this invention, together with a partially enlarged view showing a portion of a metal plate 301 shown.

Referring now to FIG. 7, there is shown a longitudinal section of a part of a pressure sensor 300 constructed according to a third embodiment of the present invention, which part has been integrally molded together with a connector housing 1 formed of synthetic resin. In FIG. 7, the longitudinal section appears with a partially enlarged section of a metal plate 301 which is a part of the pressure sensor 300.

While the pressure sensor 300 has an arrangement thereof similar to that of the pressure sensor 100 according to the first embodiment described above, the pressure sensor 300 has major features in shape of a through hole of the metal plate 301 as shaped generally as a ring, and in shape of an outer periphery of the ring-like metal plate 301.

More precisely, the metal plate 301 is formed such that a continued groove 301d, a continued ridge 301c, etc. extend along the entire of a circumferential length of the inner and outer periphery of the ring-like metal plate 301, with the groove 301d and the ridge 301c being fitted with a corresponding portion of the connector housing 1. That is, the metal plate 301 has a projections-and-recesses structure at both of the inner and outer periphery of the metal plate 301.

However it is not necessary to accept such a structure at both peripheries of the metal plate 301, and, in general, it is more important to accept such a structure at the outer periphery of the metal plate 301 than at the inner periphery of the metal plate 301.

To compare the amount of shrinkage per unit bulk of synthetic resin forming the connector housing 1, and the amount of shrinkage per unit bulk of metal of the metal plate 301, which each shrinkage occurs due to a decrease in temperature of a corresponding one of the synthetic resin and the metal, when integrally molding the connector housing 1 with the metal plate 301, the former amount of shrinkage is larger than the latter one. As a result, the ridge 301c shown in FIG. 7 is compressed by a corresponding portion of the synthetic resin forming the connector housing 1 in vertical directions opposed to each other.

This phenomenon avoids a gap between the connector housing 1 and the metal plate 301 due to a sink of the synthetic resin at the proximity of the bottom face A of the metal plate 301. It means that the sink of the synthetic resin, which takes place at the bottom face A of the metal plate 301 when the connector housing 1 is integrally molded by the synthetic resin, is prevented. The sink of the synthetic resin would cause a gap between the connector housing 1 and the metal plate 301 provided by the shrinkage of the synthetic resin as a result of the decrease in the temperature of the synthetic resin.

Owing to this fact, when the pressure sensor 300 according to the third embodiment is installed in a vehicle or the like, fatigue of the bonding wire 12 resulting from vibration of the connector housing 1, which vibration occurs due to the gap between the sink (i.e., the gap) mentioned above, would be eliminated, leading to an improvement in reliability and durability of the pressure sensor 300.

Figure 8A:
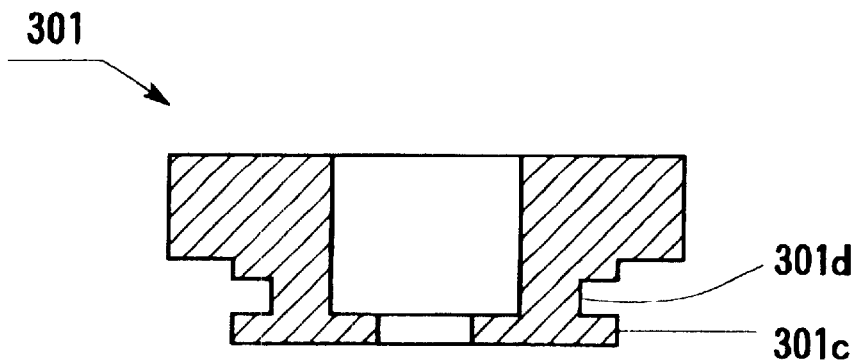
FIGS. 8A, 8B and 8C are views illustrating modifications of the metal plate 301 shown in FIG. 7.
Figure 8B:
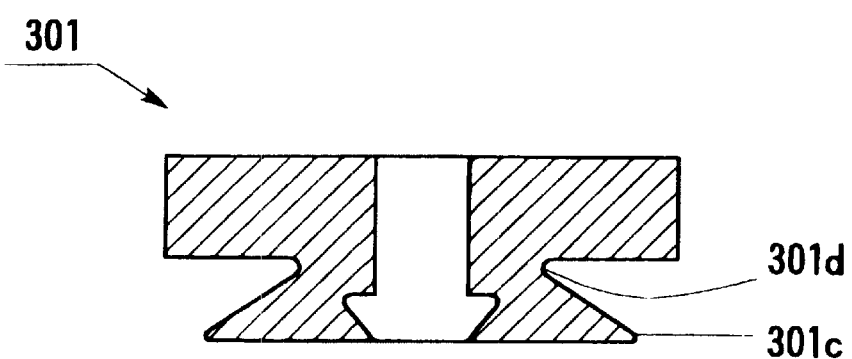
Figure 8C:
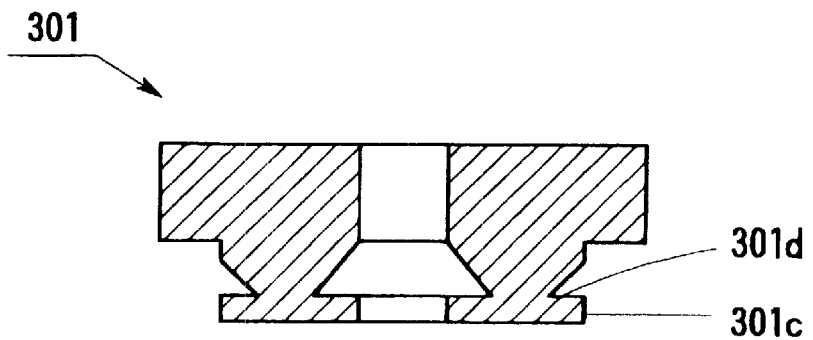

Referring now to FIGS. 8A, 8B and 8C, there are shown modifications of the metal plate 301 in the third embodiment. Adapting a projections-and-recesses structure, such as (a) a stepped groove structure, (b) a dovetail groove structure, (c) a tapered groove structure in which a bottom surface of a groove has been coaxially tapered with the metal plate 301, etc., as a structure (i.e., a sectional shape) of an outer or inner circumferential surface of the metal plate 301, would provide the same function and results as the third embodiment previously described does.

(Other Modifications)

Referring now to FIGS. 9A–9I, there are shown sections of other modifications of the metal plates 101, 201 or 301 in each embodiment of this invention previously described.

Figure 9A:
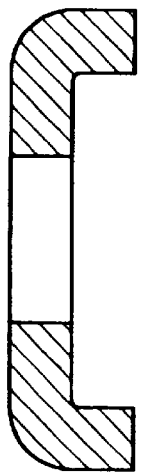
FIGS. 9A–9I are views illustrating other modifications of a metal plate 101 shown in FIG. 2, and the metal plates 201 and 301 shown in FIGS. 5B and 7, respectively.
Figure 9B:
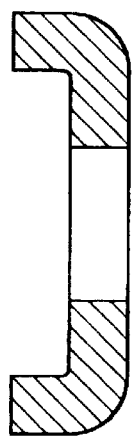
Figure 9C:
Figure 9D:
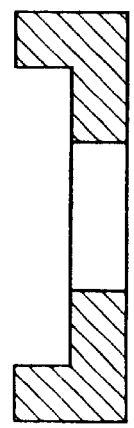
Figure 9E:
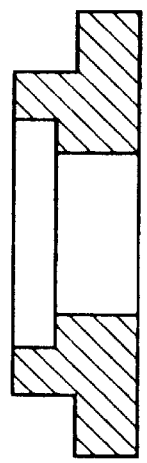
Figure 9F:
Figure 9G:
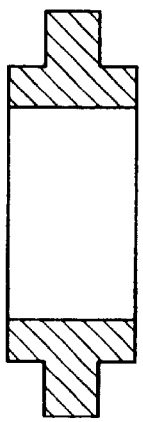
Figure 9H:
Figure 9I:
Figure 10:
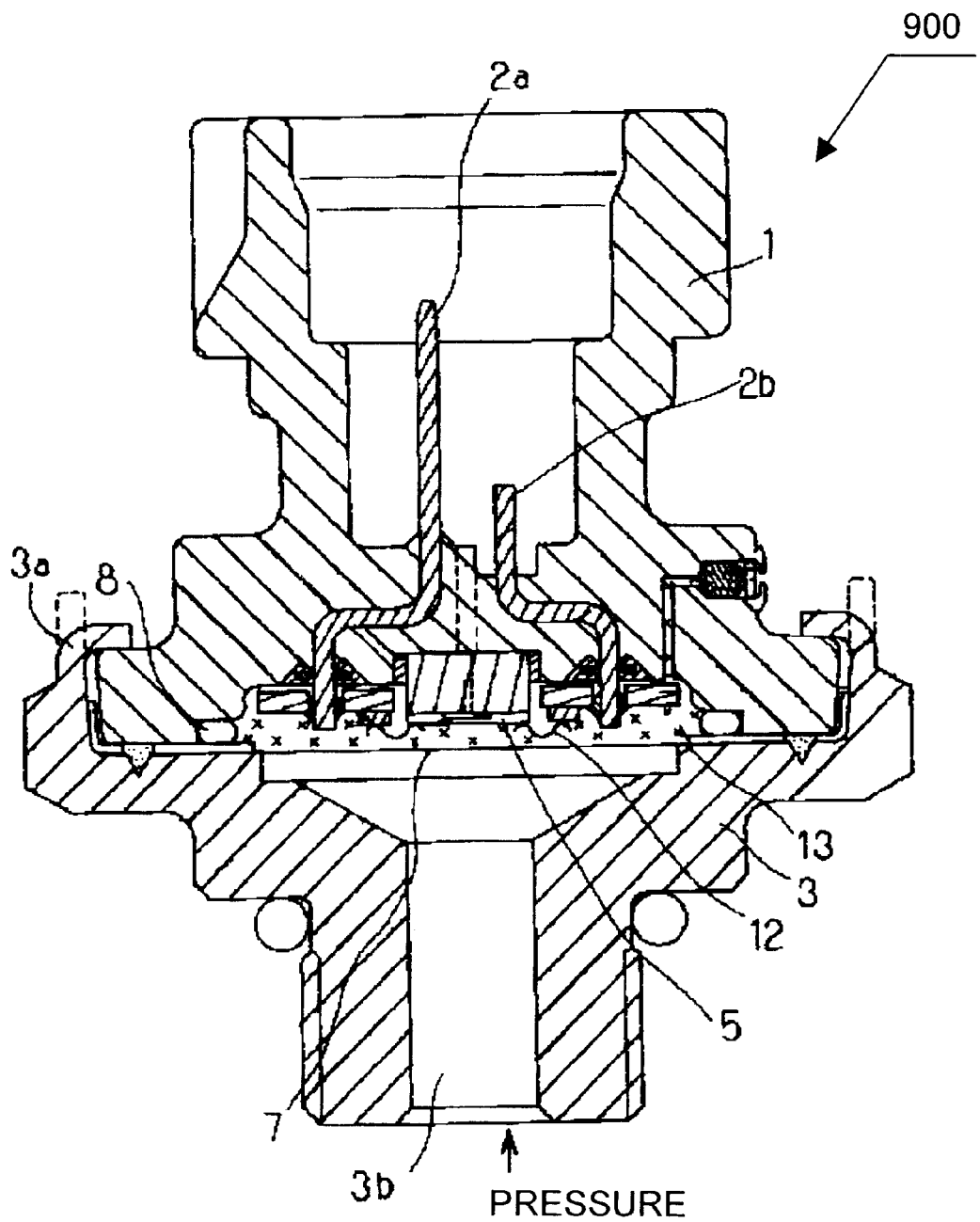
FIG. 10 illustrates a background pressure sensor.

For instance, FIGS. 9C, 9F and 9I illustrate modifications obtained by machining an original sharp edge of the shoulder portion of each metal plate 101, 201, 301 into a round one, into a tapered one, and into a stepped and tapered one, respectively. This results in the original sharp edge of the shoulder portion of the each metal plate being rounded. Rounding the sharp edge of the shoulder portion of the each metal plate permits an increase in area of the junction of the each metal plate and the sensor housing 3, and as a result, pressures are applied to the each metal plate such that the pressures are evenly distributed over the entire of the bottom face A of the each metal plate. It is followed by an improvement in joining strength between the each metal plate and the connector housing 1 and in the strength of pressure resistance of the connector housing 1.

Alternatively, an edge of the each metal plate is formed by a curling process of the each metal plate or other process, like in the manner as shown in FIGS. 9A and 9B, such that the each metal plate does not have a sharp edge on a top face of the each metal plate to receive a corresponding engaging portion of the sensor housing 3. This technology permits an increase in area of the junction of the each metal plate and the sensor housing 3, as well as the technology previously described, and as a result, pressures are applied to the each metal plate such that the pressures are evenly distributed over the entire of the bottom face A of the each metal plate. It is followed by an improvement in joining strength between the each metal plate and the connector housing 1 and in the strength of pressure resistance of the connector housing 1, as well.

In addition, forming the each metal plate so as to have an stepped edge thereof (i.e., a projections-and-recesses structure constructed by a groove, a ridge or the like) as shown in FIGS. 9D, 9E, 9G and 9H by way of example, can improve the joining strength between the each metal plate and the connector housing 1 and the strength of pressure resistance of the connector housing 1, without any additional modifications in shape of an engaging portion of the sensor housing 3 for performing the caulking mentioned before, or in shape of the mold for molding the connector housing 1.

It is to be noted that, while the connector housing 1 and the sensor housing 3 are joined and fixed to each other by the caulking in the above embodiments and modifications previously explained, the way to join these two housing 1, 3 can be modified without departing from the scope and spirit of the present invention. For example, when the shoulder portion of the connector housing 1 which functions as the junction of the connector housing 1 and the sensor housing 3 has been formed by a ring-like metal plate, the two housings 1, 3 can be joined and fixed to each other by means of other joining methods, such as welding, close fitting (e.g., tight fitting, interference fitting), threaded engagement, etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A pressure sensor comprising:
   a sensor housing formed of metal; and
   a connector housing mainly formed of synthetic resin, including a shoulder portion thereof in the form of a metal plate having an inner and an outer periphery thereof, on which shoulder portion a juncture of the sensor and connector housing is formed as a result of joining the sensor and connector housing by curling a projecting portion of the sensor housing toward the shoulder portion, wherein the curling is performed under engagement of the sensor and connector housing therebetween, for assembling the pressure sensor.

2. The pressure sensor according to claim 1, wherein the metal plate is generally shaped as a ring.

3. The pressure sensor according to claim 1, wherein the sensor housing is coaxially fitted with the connector housing, wherein the metal plate includes one reference line intersecting a plane of the metal plate, and wherein the metal plate is fitted with the connector housing such that the connector housing extends substantially parallel to the reference line.

4. The pressure sensor according to claim 1, wherein the junction of the sensor and connector housing is located on an edge of the shoulder portion of the connector housing which is formed so as to include, on a cross-section obtained by hypothetically cutting the shoulder portion by a reference plane perpendicular to a plane of the metal plate, at least one of a curved line, a straight line intersecting the plane of the metal plate, and a stepped line.

5. The pressure sensor according to claim 1, wherein the connector housing is integrally formed together with the metal plate.

6. The pressure sensor according to claim 5 wherein the connector housing is formed by a process in which the metal plate is inserted into a mold for molding the connector housing, prior to the molding, and then a mass of raw synthetic resin is fed into the mold and is thereafter hardened.

7. The pressure sensor according to claim 1, wherein the metal plate is fitted with the connector housing unremovably therefrom, by holing the metal plate by two opposing portions of the connector housing which cooperate to cause the metal plate to be interposed therebetween.

8. The pressure sensor according to claim 1, wherein the inner periphery of the metal plate is formed so as to extend, on a cross-section obtained by hypothetically cutting the metal plate by one reference plane substantially perpendicular to a direction in which pressure to be measured by the pressure sensor acts therein, to form one closed line other than a true circle.

9. The pressure sensor according to claim 8, wherein the inner periphery of the metal plate includes at least one of a convex projecting from the true circle outwardly thereof, and a concave projecting from the true circle inwardly thereof.

10. The pressure sensor according to claim 8, wherein the metal plate is fitted with the connector housing such that a space formed in the inner periphery of the metal plate is filled with the synthetic resin of the connector housing.

11. The pressure sensor according to claim 8, wherein the connector housing includes a connecting portion thereof with which a connector is to be connected, from which connecting portion at least one conductor extends passing through the inner periphery of the metal plate toward the sensor housing.

12. The pressure sensor according to claim 11, wherein the inner periphery of the metal plate is configured to have a necessary and sufficient dimension permitting the at least one conductor to pass through the inner periphery of the metal plate.

13. The pressure sensor according to claim 1, wherein the metal plate is formed such that at least one of a continued groove ridge and stepped portion extends along the entire circumferential length of at least one of the inner and outer periphery of the metal plate, with a corresponding portion of the connector housing fitted with the at least one of the continued groove, ridge and stepped portion.

14. The pressure sensor according to claim 13, wherein the connector housing is integrally formed together with the metal plate, and wherein the at least one of the continued groove, ridge and stepped portion of the metal plate is disposed at the proximity of one of two end faces of the metal plate which is closer to the sensor housing than the other end face.

15. A pressure sensor comprising:

a sensor housing formed of metal; and a connector housing mainly formed of synthetic resin, including a shoulder portion thereof in the form of a metal plate having an inner and an outer periphery thereof, on which shoulder portion the connector housing is engaged with the sensor housing, for assembling the pressure sensor, wherein a junction of the sensor and connector housing is located on an edge of the shoulder portion of the connector housing, which edge is formed so as to include, on a cross-section obtained by hypothetically cutting the shoulder portion by a reference plane perpendicular to a plane of the metal plate, at least one of a curved line, a straight line intersecting the plane of the metal plate, and a stepped line.

16. A pressure sensor comprising:

a sensor housing formed of metal; and a connector housing mainly formed of synthetic resin, including a shoulder port on thereof in the form of a metal plate having an inner and an outer periphery thereof, on which shoulder portion the connector housing is engaged with the sensor housing, for assembling the pressure sensor, wherein the connector housing is integrally formed together with the metal plate.

17. The pressure sensor according to claim 16, wherein the connector housing is formed by a process in which the metal plate is inserted into a mold for molding the connector housing prior to the molding, and then a mass of raw synthetic resin is fed into the mold and is thereafter hardened.

18. A pressure sensor comprising:

a sensor housing formed of metal; and a connector housing mainly formed of synthetic resin, including a shoulder portion thereof in the form of a metal plate having an inner and an outer periphery thereof, on which shoulder portion the connector housing is engaged with the sensor housing, for assembling the pressure sensor, wherein the inner periphery of the metal plate is formed so as to extend, on a cross-section obtained by hypothetically cutting the metal plate by one reference plane substantially perpendicular to a direction in which pressure to be measured by the pressure sensor acts therein, to form one closed line other than a true circle.

19. The pressure sensor according to claim 18, wherein the inner periphery of the metal plate includes at least one of a convex projecting from the true circle outwardly thereof, and a concave projecting from the true circle inwardly thereof.

20. The pressure sensor according to claim 18, wherein the metal plate is fitted with the connector housing such that a space formed in the inner periphery of the metal plate is filled with the synthetic resin of the connector housing.

21. The pressure sensor according to claim 18, wherein the connector housing includes a connecting portion thereof with which a connector is to be connected, from which connecting portion at least one conductor extends passing through the inner periphery of the metal plate toward the sensor housing.

22. The pressure sensor according to claim 21 wherein the inner periphery of the metal plate is configured to have a necessary and sufficient dimension permitting the at least one conductor to pass through the inner periphery of the metal plate.

23. A pressure sensor comprising:

a sensor housing formed of metal; and a connector housing mainly formed of synthetic resin, including a shoulder portion thereof in the form of a metal plate having an inner and an outer periphery thereof, on which shoulder portion the connector housing is engaged with the sensor housing, for assembling the pressure sensor, wherein the metal plate is formed such that one of a continued groove, ridge and stepped portion extends along the entire circumferential at least one of the inner and outer periphery of the metal plate, with a corresponding portion of the connector housing fitted with the at least one of the continued groove, ridge and stepped portion.

24. The pressure sensor according to claim 23, wherein the connector housing is integrally formed together with the metal plate, and wherein the at least one of the continued groove, ridge and stepped portion of the metal plate is disposed at the proximity of one of two end faces of the metal plate which is closer to the sensor housing than the other end face.

\* \* \* \* \*